United States Patent
McConica

[19]

[11] Patent Number: 5,973,846
[45] Date of Patent: Oct. 26, 1999

[54] OFFSET SPECTRA LENS SYSTEM FOR A TWO SPECTRA AUTOMATIC FOCUSING SYSTEM

[75] Inventor: Charles H. McConica, Fort Collins, Colo.

[73] Assignee: Hewlett-Packard Company, Palo Alto, Calif.

[21] Appl. No.: 09/201,547

[22] Filed: Nov. 30, 1998

[51] Int. Cl.⁶ ............................. G02B 3/10; G02B 7/02; G03B 3/00

[52] U.S. Cl. ................. 359/642; 359/615; 359/721; 359/823; 396/92; 396/82; 396/49

[58] Field of Search ................... 359/721, 724, 359/615, 822, 823, 642; 396/82, 92, 225, 49

[56] References Cited

U.S. PATENT DOCUMENTS

| | | | |
|---|---|---|---|
| 2,456,728 | 12/1948 | Ohman | 359/615 |
| 4,571,047 | 2/1986 | Hirai | 396/93 |
| 4,835,561 | 5/1989 | Matsui | 396/93 |
| 4,992,859 | 2/1991 | Yoshida | 358/55 |
| 5,020,889 | 6/1991 | Mercado et al. | 359/642 |
| 5,204,782 | 4/1993 | Mercado et al. | 359/786 |
| 5,432,332 | 7/1995 | Kaneko | 250/201 |
| 5,526,185 | 6/1996 | Herloski | 359/642 |
| 5,530,595 | 6/1996 | Freedenberg et al. | 359/721 |
| 5,597,999 | 1/1997 | Kinba et al. | 250/201 |
| 5,745,175 | 4/1998 | Anderson | 348/345 |
| 5,751,863 | 5/1998 | Farr | 382/275 |

OTHER PUBLICATIONS

Allen Nussbaum, Optical System Design, 1998, pp. 117–120.

A.E. Conrady, Applied Optics and Optical Design, 1957, pp. 143–159.

Warren J. Smith, Modern Optical Engineering, 1966, pp. 280–283 and 334–336.

*Primary Examiner*—David Nelms
*Assistant Examiner*—Evelyn A. Lester
*Attorney, Agent, or Firm*—Steven L. Webb

[57] ABSTRACT

An improved auto-focus system for a digital camera has a lens designed to have the focus of two spectra offset from each other by a predetermined amount. The two offset spectra are used to calculate two focus signals. Once the two focus signals are calculated the correct direction to move the lens system to set the optimum focus can be determined.

9 Claims, 3 Drawing Sheets

OFFSET SPECTRA LENS SYSTEM FOR A TWO SPECTRA AUTOMATIC FOCUSING SYSTEM

RELATED APPLICATIONS

This application is related to the application "Method of Using a Two Spectra Automatic Focusing System", application Ser. No. 09/201,544, filed Nov. 30, 1998.

FIELD OF THE INVENTION

This invention relates to the field of auto focus digital cameras.

BACKGROUND OF THE INVENTION

Digital cameras are typically equipped with auto-focusing systems. These systems typically have motor driven lenses that are adjusted to a position that corresponds to the maximum of a focus signal. A focus signal is a signal that has a signal strength proportional to the closeness to focus of the focusing system (the better the focus the higher the signal). The focus signal is typically calculated using the contrast method. See U.S. Pat. No. 5,597,999, which is incorporated by reference, for an example of generating a focus signal using a contrast method. Other methods of generating the focus signal are available but are not generally used in digital cameras. Focus signals are typically symmetrical along the optical axis of the focusing system (i.e. an object too near the optical system and an object to far from the optical system will both give a lower signal strength than an object at the proper focus).

For example, figure one shows a typical focus signal 102 with the maximum signal strength at point 104. The X-axis 110 is the physical distance of the object, to be focused, along the optical axis of the system. The Y-axis 112 is the signal strength of the calculated focus signal. Locations 106 and 108 are displaced from the maximum focus signal by distances 114 and 116. Location 106 is too close to the lens system to be in optimum focus and location 108 is too far from the lens system to be in optimum focus. Points 118 and 120 give the focus signal strengths at locations 106 and 108 respectively and the signal strengths are substantially equal. Because the signal strengths of location 106 and 108 are substantially equal the automatic focusing system can not differentiate between the two locations. The system can not determine, just by the signal strength of the focus signal, if the object to be focused is too close or too far from the optical system. Because it can not be determined if the object to be focused is too near or too far, the system will not know which way the lens should be moved to bring the object into focus.

There are two typical solutions to this problem. The first solution is to always start the lens at one of the positions where the lens is at its maximum movement (i.e. at the farthest or nearest lens position) and then move the lens towards the other maximum lens location until the system is in focus. This method has a number of problems. The first problem is that the total system movement for the lens can be large. For example, when the initial lens position is set to focus things at large distances and the object to be focused is very near the camera, the lens will travel almost its full movement range before the object is brought into focus. The second problem is that each time the system is to be focused the lens must be reset to the initial starting location.

The second typical solution is to set the lens in the middle of the travel range and calculate an initial focus signal strength and then move the lens some amount in one direction and calculate a second focus signal strength. Using these two calculated signal strengths the correct direction to move the lens for proper focus can be determined. This method will sometimes move the lens in the wrong direction to calculate the second focus signal strength. When the system does move the lens in the wrong direction to calculate the second focus signal strength, the lens must be moved in the direction back towards the initial location to bring the system into focus. This takes additional time.

Auto-focusing systems are typically one of two types. The first type allows the lens to be adjusted to any point between the maximum and minimum lens position. The second type has a limited number of set positions where the lens can be located.

Color digital cameras typically use area sensor arrays. These area sensor arrays are typically composed of a plurality of sensor elements or pixels in a two dimensional array. These pixels are typically covered by a set of red, green and blue filters arranged in some pattern, typically a Bayer dither pattern (see FIG. 2). The color digital camera records the information for each color using the area sensor elements covered by that color filter (i.e. the pixels covered by the red filters produce the red color signal). Because the Bayer dither pattern has twice as many pixels covered by a green filter compared to either the red or blue filters, the effective sampling rate for the green color is twice the sampling rate for either the red or blue colors. Because of this higher resolution, color digital cameras typically use the green color to calculate the focus signal. Other colors or a combination of some or all of the colors could be used to calculate the focus signal. Because the area sensor array has all the pixels or elements substantially in the same plane, the lens of the camera is typically designed to focus all of the colors in that same plane.

Lens systems typically consist of a number of optical elements. Each optical element can be made from a range of optical material. A given optical material is typically identified by the speed of light in the optical material compared to the speed of light in a vacuum (i.e. its refractive index N). The refractive index of an optical material is used to calculate the angle change a ray of light makes when entering or leaving that optical material. The refractive index of optical materials is dependent on the wavelength of light. Because the refractive index is dependent on the wavelength of light, a single element lens that focuses green light at one location will focus blue light at a different location. This difference in the focal point of different colors is called primary chromatic aberration. The dependence of the index of refraction on wavelength for a given optical material is defined by the dispersive power or Abbe number V and is calculated as $V=(Nb-Nr)/(Ny-1)$ where Nb, Nr, and Ny are the index of refraction for the given optical material at blue, yellow, and red light respectively. Different optical materials have different Abbe numbers. A lens system with two or more elements, where each element is made with a different optical material, can be designed to eliminate primary chromatic aberration. Achromates are lens systems, with two or more elements, designed to eliminate the primary chromatic aberration, typically by making the focal lengths for red light (656 nm) and blue light (486 nm) the same. There will be some chromatic aberration at wavelengths between the two corrected wavelengths, but it is typically small and called secondary or residual chromatic aberration. Lens systems can be designed to eliminate primary chromatic aberration at more than two wavelengths.

There is a need for a reduction in the amount of time required for auto focus for color digital cameras and for less expensive lenses.

SUMMARY OF THE INVENTION

An improved auto-focus system for a digital camera having a lens designed to have the focus of two spectra offset from each other by a predetermined amount. The two offset spectra are used to calculate two focus signals. Once the two focus signals are calculated the correct direction to move the lens system to set the optimum focus can be determined.

DETAILED DESCRIPTION OF THE PREFERRED EMBODIMENT

In current digital cameras the added cost of making the focal length of at least two (red and blue), and sometimes more, wavelengths set equal to each other, is considered necessary for proper image quality. The human eye is least sensitive to blue light. Therefore, a given offset in focus from the optimum focus is less objectionable in blue wavelengths than the same offset from focus in a green wavelength. In a camera in accordance with the preferred embodiment, the focal point of the blue wavelength is offset with respect to the focal point of the other wavelengths. In a digital camera, because each color is detected by an independent set of sensor elements, and each color can be processed independent of the other colors, the optical defocus of a single color can be corrected with digital signal processing. The resulting camera has the advantages of a faster focusing system and still retains good image quality for each color.

A camera in accordance with a first example embodiment of the invention determines the correct direction to move a lens system for optimal focus by calculating two focus signals from two spectra while the lens system is in an initial location. This can cut the focusing time of a lens system by up to one third the time compared to a lens system that initially moves in the incorrect direction. For example, consider an auto-focusing system that is limited to 5 focusing locations and the initial lens location is the middle or third location. When an object will be in optimum focus with the lens at focusing position 2, a camera in accordance with a first embodiment of the invention will only take one step to gain optimum focus because the correct direction to move the lens for optimum focus will be determined. In contrast, when an older auto-focusing system incorrectly moves in the wrong direction to position 4, it will have to move back through position 3 before correctly acquiring optimum focus at position 2. The total number of focusing steps or lens movements for the older system would be 3. For the example given a camera in accordance with the first example embodiment would be three times faster (one step) than the older system (three steps).

Figure 1:
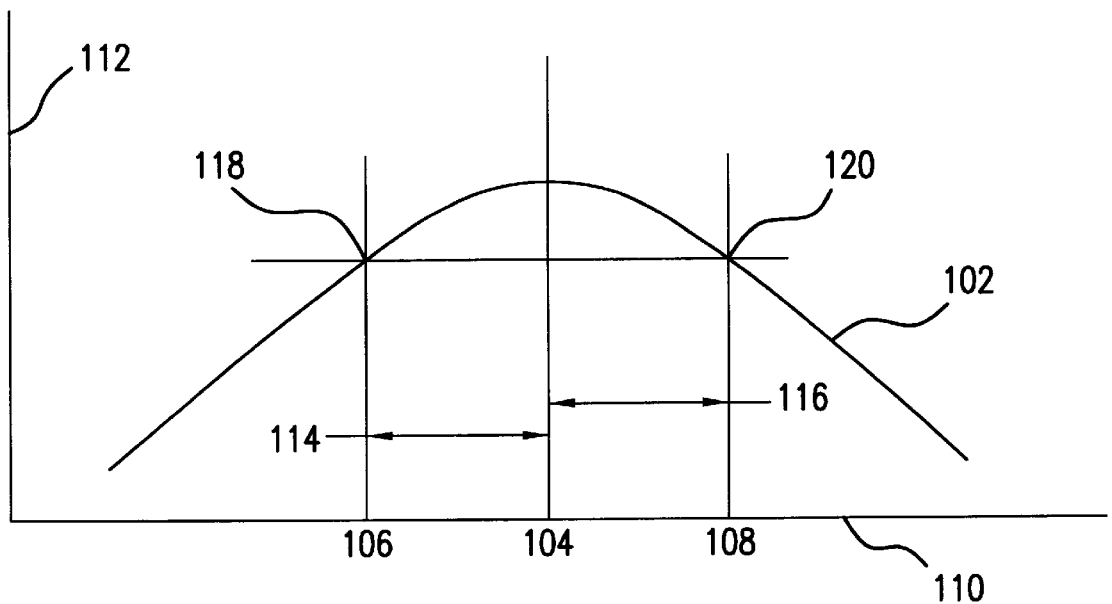
FIG. 1 is a plot of a single focusing signal.
Figure 2:
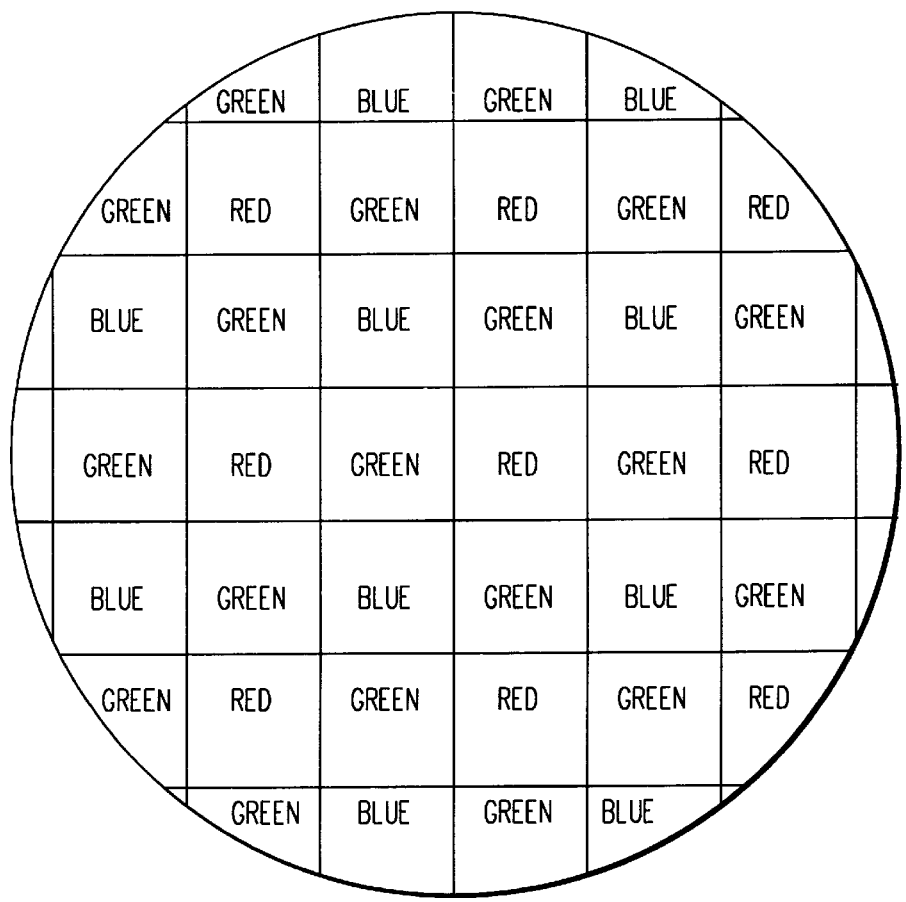
FIG. 2 is an exploded view of a Bayer dither pattern of color filters.
Figure 3:
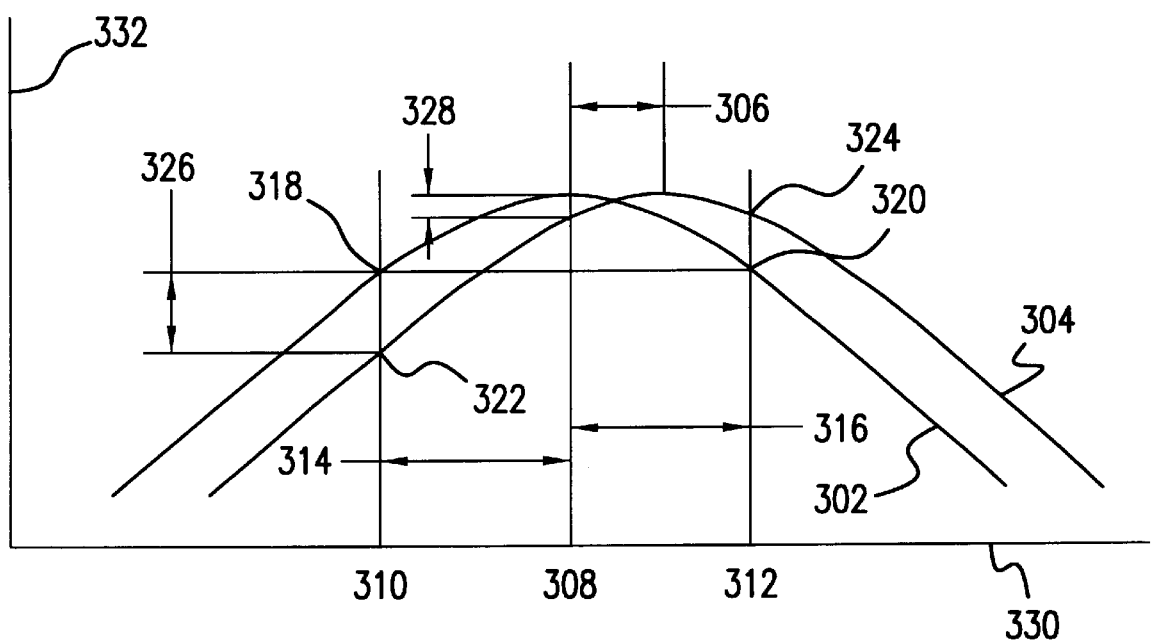
FIG. 3 is a plot of two focusing signals offset with respect to each other.

A camera in accordance with the first example embodiment uses two different spectra that have focal points offset with respect to each other to generate the two focus signals. FIG. 3 shows a plot of the focus signal strength with respect to lens position of the two spectra. The signal strength of spectra 302 is offset from the signal strength of spectra 304 by distance 306, which corresponds to the offset in the focal points between the two spectra. The X-axis 330 is the physical distance of the lens along the optical axis of the system. The Y-axis 332 is the signal strength of the calculated focus signal. Position 308 corresponds to the maximum signal strength or optimum focus point for spectra 302. Locations 310 and 312 are displaced from the maximum focus signal of spectra 302 by distances 314 and 316. At location 310 the lens is too close to the camera to be in optimum focus and at location 312 the lens is too far from the camera to be in optimum focus. Points 318 and 320 give the calculated signal strengths for spectra 302 at locations 310 and 312 respectively and the signal strengths for spectra 302 at locations 310 and 312 are substantially equal. Because the signal strengths of location 310 and 312 are substantially equal for spectra 302 the automatic focusing system can not differentiate between the two locations by only using the focus signal strength from spectra 302. When the additional information from spectra 304 is used, the correct direction to move the lens system can be determined. For example, at location 310 the signal strength of spectra 304 in shown by point 322 and is lower by amount 326 than the signal strength for spectra 302 at the same location, as shown by point 318. Because the signal strength of spectra 302 is greater than the signal strength of spectra 304 by more than distance 328 the lens must be moved away from the camera to obtain optimum focus for spectra 302. At location 312 the signal strength of spectra 302 is shown by point 320 and is lower than the signal strength of spectra 304 at the same location 312 shown by point 324. Because the signal strength of spectra 302 is lower than the signal strength of spectra 304 at location 312 the lens must be moved closer to the camera to obtain optimum focus for spectra 302.

Figure 4:
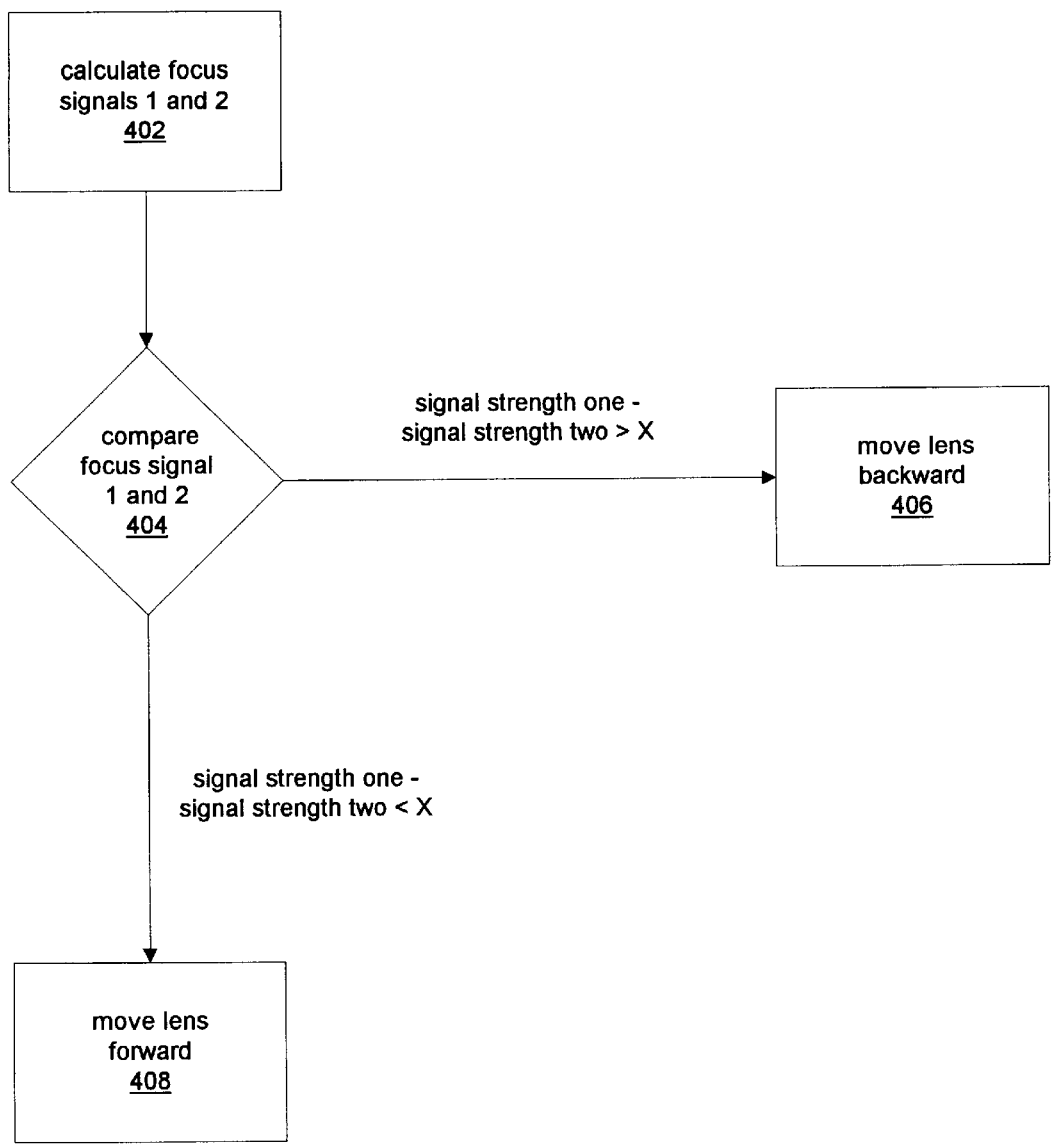
FIG. 4 is a flow chart of the two spectra focusing method.

For any location of the lens in the auto-focusing system the correct direction to move the lens to obtain optimum focus can be determined. FIG. 4 shows the flow chart for the method of determining the correct direction to move the lens system to obtain optimum focus. At the current lens position the signal strength for spectra one and spectra two are calculated (402). Next the two signal strengths are compared (404). When the signal strength of the first spectra is greater than the signal strength of the second spectra by more than amount X the lens is moved in one direction (406 ). When the signal strength of the first spectra is greater than the signal strength of the second spectra by less than amount X or the signal strength of spectra one is less than the signal strength of spectra two, the lens is moved in the opposite direction (408).

In a color digital camera the sensor array is typically covered in a pattern of three different filters, typically red, green, and blue filters to measure three color signals. These filters typically allow light in a range of wavelengths to pass through the filter. For example the blue filter would allow light in the range from 450 nm to 490 nm to pass through the filter with the center wavelength at 470 nm. Despite the band of wavelengths that the filter allows to pass, the filter is typically referred to as the blue filter and is thought of in terms of a single spectrum for calculating a focus signal strength. Because color digital cameras typically measure three color signals there are three potential independent focus signals. In current digital cameras all three color signals are focused at the same point and no additional focusing information can be derived by using more than any one color signal. In a camera in accordance with the first example embodiment of the invention the focal length for the blue color is offset from the focal points for the red and green colors. This allows the additional information obtained from the offset focus signal strength of the blue spectra to be used to determine the correct direction to move the lens.

A lens system with two or more optical elements can be designed using thin lens third order equations by tracing an axial and a principal ray through the lens system. The equations used are:

$$u' = u + y\phi \qquad (1)$$

$$y_2 = y_1 - du'_1 \qquad (2)$$

$$\phi = 1/f = (N-1)(1/r_1 - r_2) \qquad (3)$$

Where u and u' are the ray slopes before and after refraction by the elements, $\phi$ is the elements power (reciprocal focal length 1/f), y is the height at which the ray strikes the element and d is the spacing between adjacent elements, N is the refractive index for that element and $r_1$ and $r_2$ are the radius of curvature for that element. The paraxial transverse axial chromatic aberration contribution for each element in the lens system is given by:

$$LchC = \frac{-y^2 \phi}{V u'^2_k} \qquad (4)$$

Where $u'_k$ is the final slope of the axial ray at the image. V is the Abbe number of the lens material for that element. The total chromatic aberration for a lens system with two elements, assigning subscripts a and b to the two elements, would be:

$$\sum LchC = LchC_a + LchC_b = \frac{-Y_a^2 \phi_a}{V_a u'^2_k} + \frac{-Y_b^2 \phi_b}{V_b u'^2_k} \qquad (5)$$

When the elements are cemented together or very nearly in contact, $y_a = y_b = y$ and $u'_k = y/f$. Substituting these expressions into equation (5) results in:

$$\sum LchC = -f^2 \left[ \frac{\phi_a}{V_a} + \frac{\phi_b}{V_b} \right] \qquad (6)$$

Typically the total chromatic aberration $\Sigma LchC$ is set to zero. In a camera in accordance with the first example embodiment of the invention the chromatic aberration is set to some predetermined offset value $\Delta$ or:

$$\Delta = -f^2 \left[ \frac{\phi_a}{V_a} + \frac{\phi_b}{V_b} \right] \qquad (7)$$

The total power of a system is the sum of the power of the elements or:

$$\frac{1}{f} = \phi_a + \phi_b \qquad (8)$$

Equations 7 and 8 are solved simultaneously to get the necessary powers for each element in the lens system.

$$\phi_a = \frac{V_a f + \Delta V_a V_b}{f^2 (V_a - V_b)} \qquad (9)$$

$$\phi_b = \frac{V_b f + \Delta V_a V_b}{f^2 (V_b - V_a)} \qquad (10)$$

Once the powers of the two elements have been determined the radius of curvature for each surface can be determined using equation 3.

More than two lens elements can be used and the chromatic aberration for more than two wavelengths can be controlled. For example, the focal points for the red and green wavelengths can be set equal to each other and the focal point for the blue wavelength can be offset by a predetermined amount with respect to the red and green focal length.

What is claimed is:

1. A lens system comprising:
    a first optical element made with a first optical material;
    a second optical element made from a second optical material, where the second optical material has a different dispersive power than the first optical material;
    a focal length for a first spectra;
    a focal length for a second spectra, where the focal length of the first spectra is different, by a predetermined amount, than the focal length of the second spectra.
2. A lens system as in claim 1:
    where the first spectra is a red spectra and the second spectra is a blue spectra.
3. A lens system as in claim 1:
    where the first spectra is a green spectra and the second spectra is a blue spectra.
4. A lens system as in claim 1:
    where the second spectra is a red spectra and the first spectra is a blue spectra.
5. A lens system as in claim 1:
    where the second spectra is a green spectra and the first spectra is a blue spectra.
6. A lens system as in claim 1:
    where the first spectra is a green spectra and the second spectra is a red spectra.
7. A lens system as in claim 1:
    where the second spectra is a green spectra and the first spectra is a red spectra.
8. A lens as in claim 1 further comprising:
    a focal length of a third spectra, where the focal length of the third spectra is the same as the focal length of the first spectra.
9. A lens as in claim 8:
    where the first spectra is green, the second spectra is blue, and the third spectra is red.

* * * * *